United States Patent
Amon

(10) Patent No.: US 9,872,017 B2
(45) Date of Patent: Jan. 16, 2018

(54) METHOD FOR CODING A SEQUENCE OF DIGITIZED IMAGES

(75) Inventor: Peter Amon, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 974 days.

(21) Appl. No.: 14/003,924

(22) PCT Filed: Feb. 22, 2012

(86) PCT No.: PCT/EP2012/052974
§ 371 (c)(1),
(2), (4) Date: Sep. 9, 2013

(87) PCT Pub. No.: WO2012/119855
PCT Pub. Date: Sep. 13, 2012

(65) Prior Publication Data
US 2014/0003526 A1    Jan. 2, 2014

(30) Foreign Application Priority Data
Mar. 9, 2011    (EP) .................................... 11157462

(51) Int. Cl.
*H04N 7/36*        (2006.01)
*H04N 19/583*    (2014.01)
(Continued)

(52) U.S. Cl.
CPC ..... *H04N 19/00733* (2013.01); *H04N 19/107* (2014.11); *H04N 19/137* (2014.11);
(Continued)

(58) Field of Classification Search
None
See application file for complete search history.

(56) References Cited

U.S. PATENT DOCUMENTS 6,408,096 B2    6/2002    Tan
6,408,099 B2    6/2002    Tan
(Continued)

FOREIGN PATENT DOCUMENTS

CN    101621687    1/2010
DE    102007049351    4/2009
(Continued)

OTHER PUBLICATIONS

European Office Action dated Jan. 8, 2016 in corresponding European Patent Application No. 12706530.8.
(Continued)

*Primary Examiner* — Mohammad J Rahman
(74) *Attorney, Agent, or Firm* — Slayden Grubert Beard PLLC

(57) ABSTRACT

In a method for coding a sequence of digitized images, a motion compensation process is performed, the motion compensation process using motion vectors between image blocks referring to a number of pixels in a current image and reference blocks referring to a number of pixels in a reference image. The reference image is based on one or more images out of the sequence. For each image block of at least a part of the current image a temporal prediction based on a corresponding reference block indicated by a motion vector is performed, resulting in a prediction error between the image block and the corresponding reference block, where the prediction error is coded. In the method of the invention, the current image in the sequence is divided into several image areas, with a reference area in the reference image being associated with each image area. The temporal prediction of an image block in an image area is based on a reference block at least partially located in the reference area associated with the image area and including pixel information from this reference area.

17 Claims, 3 Drawing Sheets

(51) Int. Cl.
*H04N 19/176* (2014.01)
*H04N 19/70* (2014.01)
*H04N 19/51* (2014.01)
*H04N 19/61* (2014.01)
*H04N 19/107* (2014.01)
*H04N 19/137* (2014.01)
*H04N 19/17* (2014.01)
*H04N 19/55* (2014.01)

(52) U.S. Cl.
CPC ........... *H04N 19/17* (2014.11); *H04N 19/176* (2014.11); *H04N 19/51* (2014.11); *H04N 19/55* (2014.11); *H04N 19/61* (2014.11); *H04N 19/70* (2014.11)

(56) References Cited

U.S. PATENT DOCUMENTS

| | | | |
|---|---|---|---|
| 6,421,465 | B2 | 7/2002 | Tan |
| 6,480,628 | B2 | 11/2002 | Tan |
| 6,563,954 | B2 | 5/2003 | Tan |
| 6,570,923 | B2 | 5/2003 | Saunders et al. |
| 6,577,256 | B2 | 6/2003 | Kimura et al. |
| 7,302,001 | B2 | 11/2007 | Wang et al. |
| 7,760,802 | B2 | 7/2010 | Wang et al. |
| 7,826,531 | B2 | 11/2010 | Wang et al. |
| 8,428,131 | B2 | 4/2013 | Shimada et al. |
| 8,908,760 | B2 | 12/2014 | Jeon et al. |
| 2002/0037052 | A1 | 3/2002 | Kimura et al. |
| 2003/0053543 | A1* | 3/2003 | Bhaumik ............... H04N 5/145 375/240.16 |
| 2005/0053290 | A1 | 3/2005 | Wada et al. |
| 2008/0025394 | A1* | 1/2008 | Francois .............. H04N 19/647 375/240.12 |
| 2009/0016621 | A1* | 1/2009 | Nakagawa ........... H04N 19/105 382/236 |
| 2009/0028246 | A1* | 1/2009 | Miyoshi ............... H04N 19/197 375/240.16 |
| 2010/0172412 | A1 | 7/2010 | Shimada et al. |
| 2010/0254458 | A1 | 10/2010 | Amon et al. |
| 2010/0322314 | A1* | 12/2010 | Huang ................... H04N 19/56 375/240.16 |
| 2011/0188766 | A1* | 8/2011 | Nassor ................... H04N 7/327 382/233 |
| 2012/0093217 | A1 | 4/2012 | Jeon et al. |
| 2013/0039411 | A1* | 2/2013 | Aoki ..................... H04N 19/172 375/240.03 |
| 2013/0128981 | A1* | 5/2013 | Kazui ................... H04N 19/50 375/240.16 |

FOREIGN PATENT DOCUMENTS

| | | |
|---|---|---|
| EP | 11157462 | 3/2011 |
| EP | PCT/EP2012/052974 | 2/2012 |
| JP | 11-346370 | 12/1999 |
| JP | 2001-197505 | 7/2001 |
| JP | 2002-34047 | 1/2002 |
| JP | 2002-84545 | 3/2002 |
| JP | 2005-65239 | 3/2005 |
| JP | 2006-50491 | 2/2006 |
| JP | 2006-505153 | 2/2006 |
| JP | 2006-287583 | 10/2006 |
| WO | 2009/037726 | 3/2009 |
| WO | WO 2009/037726 A1 | 3/2009 |
| WO | 2010/114283 A2 | 10/2010 |

OTHER PUBLICATIONS

Chinese Office Action dated Dec. 7, 2015 in corresponding Chinese Patent Application No. 201280012320.8.
English Translation of Office Action dated Sep. 22, 2014 for corresponding Japanese Patent Application No. 2013-557034.
Office Action dated Sep. 25, 2014 for corresponding European Patent Application No. 12 706 530.8.
Kimihiko Kazui et al., "Proposal of requirement on very low delay coding," Joint Collaborative Team on Video Coding (JCT-VC) of ITU-T SG16 WP3 and ISO/IEC JTC1/SC29/WG11, Document JCTVC-B031, Jul. 21-28, 2010, 10 pages.
Kimihiko Kazui et al., "Draft description of proposed syntax and semantics for very low delay coding," Joint Collaborative Team on Video Coding (JCT-VC) of ITU-T SG16 WP3 and ISO/IEC JTC1/SC29/WG11, Document JCTVC-D053, Jan. 20-28, 2011, 19 pages.
Kimihiko Kazui et al., "Benefit of the new syntax and semantics for very low delay coding in HEVC," Joint Collaborative Team on Video Coding (JCT-VC) of ITU-T SG16 WP3 and ISO/IEC JTC1/SC29/WG11, Document JCTVC-D054, Jan. 20-28, 2011, 5 pages.
Thomas Wiegand et al., "Overview of the H.264/AVC Video Coding Standard," IEEE Transactions on Circuits and Systems for Video Technology, vol. 13, No. 7, Jul. 2003, pp. 560-576.
English language International Search Report for PCT/EP2012/052974, dated Jul. 27, 2012, 3 pages.
Japanese Office Action for related Japanese Patent Application No. 2013-557034, dated Feb. 16, 2015, 2 pages.

* cited by examiner

METHOD FOR CODING A SEQUENCE OF DIGITIZED IMAGES

CROSS REFERENCE TO RELATED APPLICATIONS

This application is based on and hereby claims priority to International Application No. PCT/EP2012/052974 filed on Feb. 22, 2012 and European Application No. 11157462.0 filed on Mar. 9, 2011, the contents of which are hereby incorporated by reference.

BACKGROUND

The invention refers to a method for coding a sequence of digitized images as well as to a method for decoding such a sequence. Furthermore, the invention refers to a coding apparatus and a decoding apparatus as well as to a system including a coding apparatus and a decoding apparatus.

For digital video coding with high coding efficiency, so-called motion compensation is used. In motion compensation, motion vectors between similar image blocks in the image to be coded and a corresponding reference image are determined. A motion vector references a reference block in the reference image having the same or very similar image information as a block in the image to be coded. Motion compensation takes into account that many structures in an image are only shifted and do not change from one image to the next. Based on an image block and its corresponding reference block, the prediction error between those blocks is calculated and used for coding.

Under certain circumstances, there is a need to restrict the reference blocks which are used for prediction to certain areas in the reference image. E.g., a video coding process is described where a gradual intra refresh of only a region in each image is performed, as described in the following documents:

Kimihiko Kazui, Junpei Koyama, Akira Nakagawa, "Evaluation result of JCTVC-B031", ISO/IEC JTC1/SC29/WG11 and ITU-T SG16 WP3, document JCTVC-C021/M18028, Guanzhou, China, October 2010.

Kimihiko Kazui, Junpei Koyama, Akira Nakagawa, "Draft description of proposed syntax and semantics for very low delay coding", ISO/IEC JTC1/SC29/WG11 and ITU-T SG16 WP3, document JCTVC-D053/M18800, Daegu, Korea, January 2011.

Kimihiko Kazui, Junpei Koyama, Akira Nakagawa, "Benefit of the new syntax and semantics for very low delay coding in HEVC", ISO/IEC JTC1/SC29/WG11 and ITU-T SG16 WP3, document JCTVC-D054/M18801, Daegu, Korea, January 2011.

As a consequence, an image comprises an updated area with already intra-coded regions and a non-updated area with regions not yet intra-coded. In this scenario, it is prohibited to predict image blocks in the updated area of the image from reference blocks in the non-updated area of the reference image. Otherwise, in case of random access into the video stream, these references would result in mismatches since the blocks in the non-updated area are not correctly decoded.

In German Patent Application No. 10 2007 049 351 A1, a method for generating a coded video stream based on several input video streams is disclosed. It is mentioned in this document that the prediction for coding the pictures in one video stream shall only be performed within the boundary of those pictures.

SUMMARY

One possible object is to provide a method for coding a sequence of digitized images with a high coding efficiency and taking into account coding restrictions with respect to a temporal prediction of image blocks.

In the method, a motion compensation process is performed, said motion compensation process using motion vectors between image blocks referring to a number of pixels in a current image and reference blocks referring to a number of pixels in a reference image, said reference image being based on one or more images out of the sequence. Within the motion compensation process, for each image block of at least a part of the current image a temporal prediction based on a corresponding reference block indicated by a motion vector is performed, resulting in a prediction error between the image block and the corresponding reference block. This prediction error is coded by appropriate coding techniques. According to the method, the current image in the sequence of digitized images is divided into several image areas, a reference area in the reference image being associated with each image area, wherein the temporal prediction of an image block in an image area is based on a reference block at least partially located in the reference area associated with the image area and exclusively including pixel information from this reference area.

The method has the advantage that restrictions with respect to the temporal prediction can be taken into account for several image blocks. This is achieved by an appropriate association of reference areas with image areas where only predictions from an associated reference area to the image area are allowed.

As mentioned above, a reference block may only be partially located in the reference area. However, the pixel information in the reference block has to be based exclusively on information within the reference area. In a preferred embodiment, beside reference blocks completely located in the reference area, border reference blocks extending beyond a corresponding reference area can be used for temporal prediction, where the values of the pixels of a border reference block which lie outside the reference area are determined exclusively based on values of pixels of the border reference block inside the reference area. To do so, well-known border extension algorithms can be used for obtaining pixel values for pixels outside the reference area. Particularly, the values of pixels of a border reference block which lie at the border of the reference area are assigned to pixels of the border reference block which lie outside the reference area. This is a well-known extrapolation technique for assigning pixel values at the border of the reference area to pixels outside the area. Particularly, corresponding extension directions in the image, e.g. in horizontal or vertical direction, can be defined for extending the pixel values at the border beyond the reference area.

In another embodiment, the reference image is a reconstructed image generated from an image compressed during coding or including parts from several reconstructed images.

In another variant, the coding of the prediction includes a transformation step, a quantization step and a lossless entropy coding step. Those coding steps are well-known in the prior art. Preferably, the reconstructed image or reconstructed images forming the reference image are images compressed by the transformation step and the quantization step and reconstructed by performing an inverse transformation and an inverse quantization.

In a one preferred embodiment, the method is used for a mixed video stream comprising several videos, where each image area and reference area associated with the image area correspond to a (common) video in a mixed video stream. By restricting the prediction to separate videos, mismatches in the motion compensation processes are avoided.

In another embodiment, one or more of the image areas are each divided into sub-areas, where for one or more of the sub-areas additional coding restrictions apply. In order to indicate the division of an image into image areas and sub-areas, a hierarchical index scheme can be used. According to this scheme, the same hierarchical index value refers to corresponding areas in the current image and the reference image for which temporal prediction is allowed. In a preferred embodiment, sub-areas may be divided into further smaller sub-areas which can also be signalled by the above mentioned index scheme. In another embodiment, an additional index in the index scheme is reserved which is used to indicate a sub-area in the image area which can be temporally predicted from all sub-areas in the reference image which are in the same hierarchy level as the sub-area in the image area.

In another embodiment, spatially subsequent sections in at least one image area are intra-coded from one current image to the next, wherein an intra-coding cycle is defined such that, after a predetermined number of images have been coded, the whole image area has been intra-coded. This embodiment is a combination of motion compensation based on image areas with a gradual intra refresh coding as defined in the previously mentioned Kazui et al. documents.

Using this intra-coding technique, a full intra-update of the corresponding image areas is achieved after a number of images. This method reduces the buffer size and results in a low delay when transmitting the sequence of images over constant bit-rate channels.

In a variant of the above described embodiment, said at least one image area is divided in an updated and a non-updated sub-area, the updated sub-area referring to those sections which have already been intra-coded in the intra-coding cycle and the non-updated sub-area referring to those sections which have not yet been intra-coded in the intra-coding cycle. The temporal prediction of an image block in an updated sub-area is preferably based on a reference block exclusively including pixel information from an updated sub-area of the reference area associated with the image area, whereas the temporal prediction of an image block in a non-updated sub-area is based on a reference block which can include pixels from the updated and the non-updated sub-area of the reference area, i.e. pixels from either the non-updated or updated sub-area or from both the updated and the non-updated sub-area.

In another embodiment, the image areas and/or additional image areas in the current image are processed independently of each other with respect to one or more predetermined processing steps other than temporal prediction, particularly for intra-prediction and/or deblocking filtering and/or in-loop filtering and/or interpolation filtering.

The division of the images into image areas according to the invention can be signalled in different ways. In one embodiment, this division is signalled in each coded image. Additionally or alternatively, the division can also be signalled in a parameter set defined separately from the coded images.

Beside the above coding method, there is a method for decoding a sequence of digitized images which are coded by the above method. In this decoding method, the prediction error in the coded signal is decoded and a motion compensation process is performed using the same motion vectors as for coding. Hence, the motion vectors used for coding are available in the method for decoding. E.g., the motion vectors are transmitted as further information in the coded video stream. In the decoding method, the decoded prediction error is used for calculating the reference images for the motion compensation process.

In addition, there is also a method for coding and decoding a sequence of digitized images wherein the images are coded by the above described coding method and the coded images are decoded by the above described decoding method.

Also included is an apparatus for decoding a sequence of digitized images comprising:

means for performing a motion compensation process, said motion compensation process using motion vectors between image blocks referring to a number of pixels in a current image and reference blocks referring to a number of pixels in a reference image, said reference image being based on one or more images out of the sequence, where for each image block of at least a part of the current image a temporal prediction based on a corresponding reference block indicated by a motion vector is performed, resulting in a prediction error between the image block and the corresponding reference block;

means for coding the prediction error.

The means for performing a motion compensation process in this apparatus comprises means for dividing the current image in the sequence into several image areas, a reference area in the reference image being associated with each image area, wherein the temporal prediction of an image block in an image area is based on a reference block at least partially located in the reference area and exclusively including pixel information from the reference area.

The apparatus is preferably arranged for performing any of the above described preferred embodiments of the coding method according to the invention.

In addition, there is an apparatus for decoding a sequence of digitized images which are coded by the coding method. This apparatus comprises means for decoding the prediction error as well as means for performing a motion compensation process using the same motion vectors as for coding.

There is also included an apparatus for coding and decoding a sequence of digitized images, the system including the above described coding apparatus and the above described decoding apparatus.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
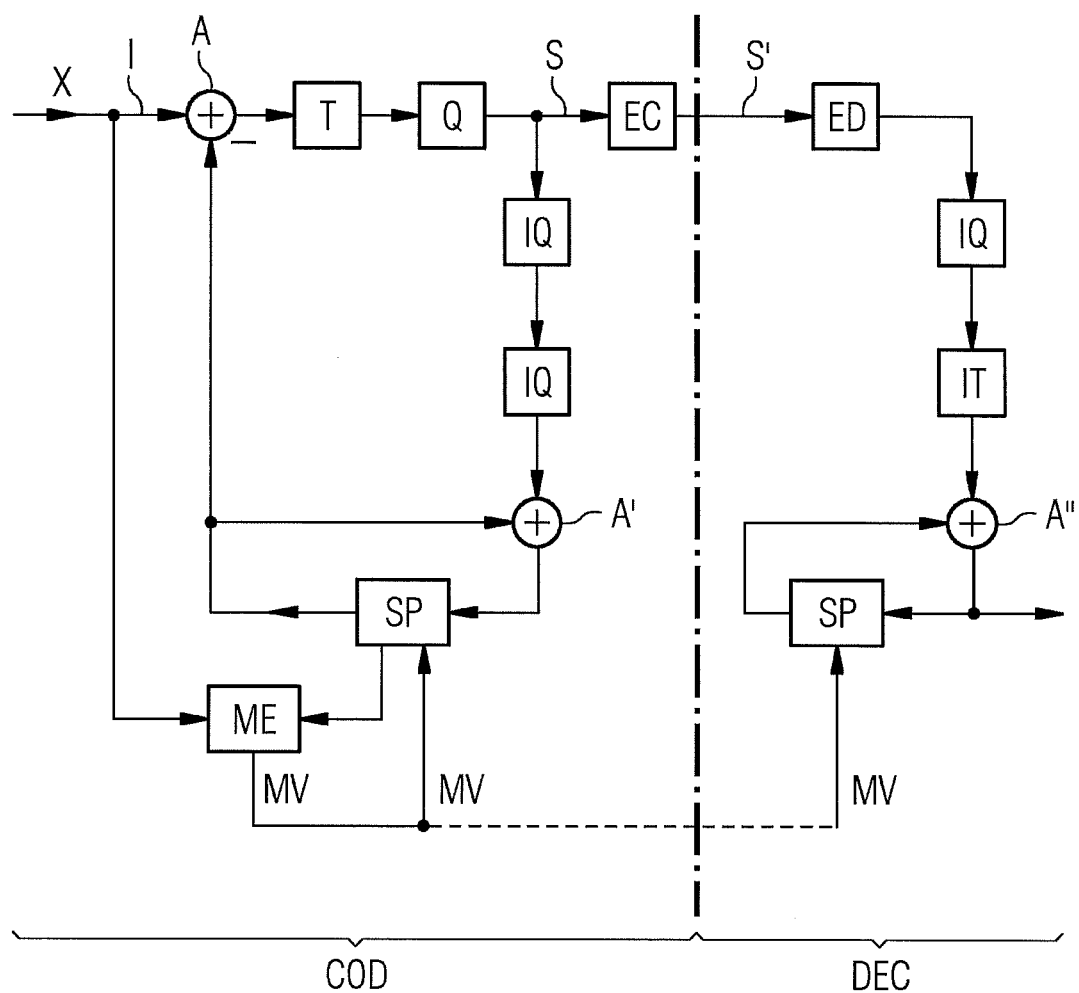
FIG. 1 shows a schematic diagram illustrating the coding and decoding of a video stream according to an embodiment.

Reference will now be made in detail to the preferred embodiments of the present invention, examples of which are illustrated in the accompanying drawings, wherein like reference numerals refer to like elements throughout.

FIG. 1 shows the steps for coding and decoding a video stream based on an embodiment. In the left part of FIG. 1, a coding means COD for coding a video stream X is shown. The right part of FIG. 1 illustrates a decoding means DEC which is used for decoding of a video stream coded by the coding means COD. The video stream X comprises a plurality of images I which is subjected to a coding process. In this process, a prediction error signal is coded. This signal represents the difference between an input signal I forming the current image to be coded and a motion compensated reconstruction of a reference image which is a preceding image in the embodiment of FIG. 1. However, the reference image may also be composed of parts from different images before and/or after the current image according to the temporal order of the images in the video stream.

The prediction error which is determined in FIG. 1 by the adding means A as the difference between the input image and the predicted image is subjected to a transformation T, particularly a well-known DCT transformation (DCT=Discrete Cosine Transformation). The transformation coefficients generated by this transformation are thereafter quantized in a quantization means Q. As a result, symbols S for corresponding macro blocks in the image are obtained. These symbols represent coded image information comprising transformation coefficients, motion vectors used for prediction as well as further coding parameters.

Figure 3:
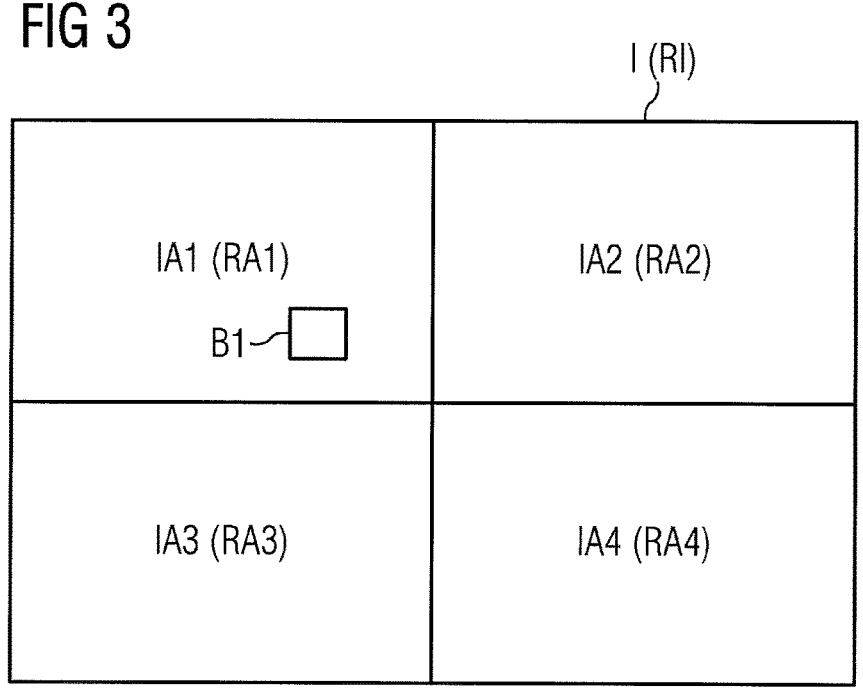
FIG. 3 illustrates a motion compensation process based on an embodiment.

The motion vectors used during coding are designated as MV in FIG. 3. Those motion vectors are determined in a motion estimation step ME where for image blocks in the current image I similar image blocks in the reference image are determined, where the reference image is stored in the image storage SP. The motion vectors describe the shift between the image block in the current image and the corresponding similar image block in the reference image. Those motion vectors are needed to perform decoding. Hence, the motion vectors are transmitted to the decoding means DEC as indicated by the dashed line in FIG. 1. The reference image in the storage SP is generated from the symbols S by performing an inverse quantization IQ and an inverse transformation IT, resulting in a reconstructed prediction error. This prediction error is added by adding means A' to a preceding reconstructed reference image in the storage SP, resulting in a new reference image.

The description up to now refers to a general coding process known from the prior art. According to an aspect of an embodiment, an image to be coded is divided into several image areas, where a reference area in the corresponding reference image is associated with each image area. The image areas and reference areas restrict the temporal prediction based on the motion compensation process such that a reference block used for calculating the prediction error for an image block in an image area exclusively includes information from the reference area associated with the image area. By an appropriate definition of image areas and reference areas, coding errors are avoided. This is particularly helpful in case that the image areas refer to separate videos included in a video stream represented by the sequence of images I. A detailed description of the above mentioned motion compensation process based on image areas and reference areas will be given later on with respect to FIGS. 3 and 4.

The coding means COD in FIG. 1 further includes a well-known entropy coding means EC. This coding means performs lossless entropy coding of the symbols S and leads to higher coding efficiency. The entropy coded symbols S' are transmitted to the decoder DEC, which performs an entropy decoding ED, an inverse quantization IQ, and an inverse transformation IT. Thus, a decoded prediction error is determined. Based on this error and the motion vectors MV transmitted to the decoder and stored in a storage SP, a motion compensation process for determining the original decoded image is performed. To do so, the prediction error is combined by adding means A" with a motion compensated decoded image in the storage SP.

Figure 2:
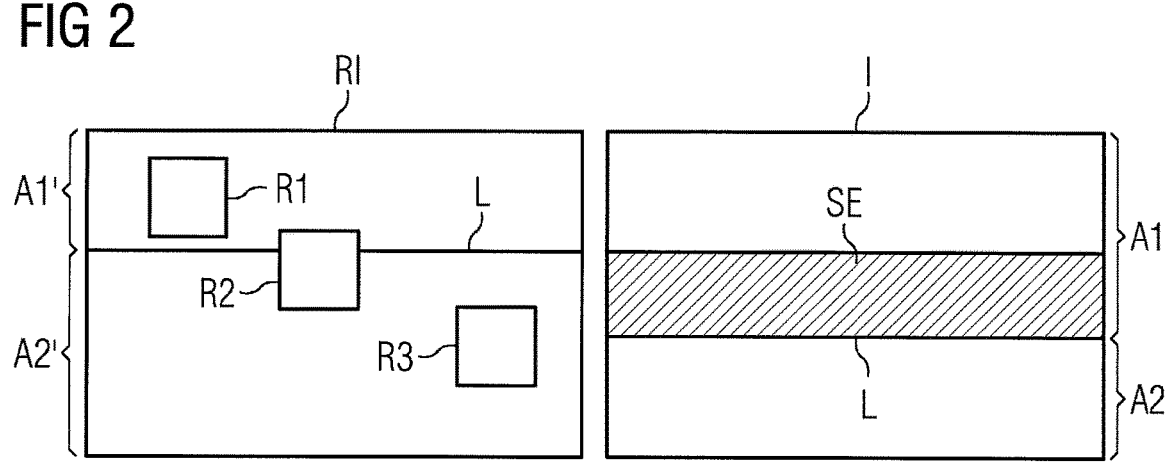
FIG. 2 illustrates a motion compensation process for images subjected to a gradual intra refresh according to the prior art.

A prior art motion compensation process as shown in the previously mentioned Kazui et al. documents is described. This motion compensation process may be combined with a motion compensation process according to the invention. The prior art motion compensation process is illustrated in FIG. 2 which shows a current image I to be coded as well as a corresponding reference image RI used for motion compensation. According to the coding process in FIG. 2, only a part of the image is intra-coded. This part is designated as section SE in FIG. 2 and moves from one image to the next downwards. The intra-coding is performed in intra-coding cycles, wherein, after having coded all images within a coding cycle, all sections in the image have been updated by an intra-coding step. In FIG. 2, the area A1 above the line L forms the updated area of sections which have already been intra-coded in the corresponding coding cycle. Contrary to that, the area A2 forms the non-updated area of sections which have not yet been intra-coded in the current intra-coding cycle. Analogously to the image I, the reference image RI includes an updated area A1' and a non-updated area A2' where the updated area A1' is smaller in comparison to A1 because the section SE has not yet been intra-coded in the reference image RI.

In the temporal prediction performed in FIG. 2, it must be prohibited that an image block in the already updated area A1 is predicted from a reference block included in the non-updated area A2' in the reference image RI. Due to this coding restriction, an image block in the updated area A1 may only be predicted from a reference block in the area A1', such as the reference block R1. Reference blocks R2 and R3 are not allowed to be used for image blocks in the area A1 because those blocks are at least partially included in the non-updated area A2'. Contrary to that, for an image block in the non-updated area A2, a reference block in an arbitrary position in the reference image RI may be used, i.e. reference block R1 as well as reference blocks R2 or R3 may be used for prediction.

In the previously mentioned Kazui et al. documents, a method to signal the updated area as described above is disclosed. This allows a special treatment of reference blocks that are in both areas, e.g. of block R2. While the part of the block R2 that lies within the updated area is used for reference, the part of block R2 that is in the non-updated area is replaced by pixels generated by extrapolation from the updated area. Unlike the method of the invention, the method disclosed in the previously mentioned Kazui documents signals a single area boundary, i.e. the boundary between the updated and non-updated area. However, this description of areas is not suitable to describe several image areas and reference areas since only a single area with restricted reference can be signalled. Furthermore, the only restriction imposed is that predictions from the non-updated area to the updated area are not allowed.

FIG. 3 shows a motion compensation process based on a first embodiment. This figure illustrates the current image I where the structure of a corresponding reference image RI is identical to this image. Hence, the corresponding reference image is indicated in parentheses as RI. The image I is divided into four image areas IA1, IA2, IA3, and IA4. Identical reference areas RA1, RA2, RA3, and RA4 are included in the reference image RI. The reference area associated with the image area IA1 is designated as RA1, the reference area associated with the image area IA2 is designated as RA2, the reference area associated with the image area IA3 is designated as RA3, and the reference area associated with the image area IA4 is designated as RA4.

The embodiment shown in FIG. 3 refers to a mixed video stream where each of the image areas IA1 to IA4 corresponds to a separate video. In order to avoid temporal prediction between different videos, predictions for image blocks in the respective image areas IA1 to IA4 are only allowed based on reference blocks exclusively including pixel information from the associated reference areas RA1 to RA4. In FIG. 3, an example of an image block B1 is shown. This block can only be predicted from a reference block which completely lies within the corresponding reference area RA1 or which partially lies within the area RA1 but only includes pixel information from this area.

In case of reference blocks that lie partially outside an associated reference area, only the pixels of the active reference area are used. The other pixels (i.e. pixels in neighboring image areas) are extrapolated using well-known border extension algorithms, e.g. an extrapolation. In a preferred embodiment, the values of pixels at a border of a reference area are used as the values for pixels lying outside the reference area. Particularly, pixel values are extended in the horizontal direction with respect to a vertical border or in a vertical direction with respect to a horizontal border.

The embodiment as described with respect to FIG. 3 refers to rectangular image areas and reference areas. However, in principle an arbitrary shape of the areas is allowed. In order to signal the sub-division of an image into smaller image areas, two options are possible. In the first option, the sub-division is defined and signalled within each coded image. In the second option, the sub-division of the image can be defined separately from the coded images, e.g. in a picture parameter set. The sub-divisions are then indicated by a reference to the parameter set.

The embodiment shown in FIG. 3 can also be combined with the embodiment shown in FIG. 2. To do so, each image area IA1 can be represented by the image I as shown in FIG. 2 so that the same prediction restrictions with respect to the updated and non-updated areas apply to each of the image areas. Furthermore, the restriction that an image block can only be predicted from an associated reference area is also valid in such a combined embodiment.

Figure 4:
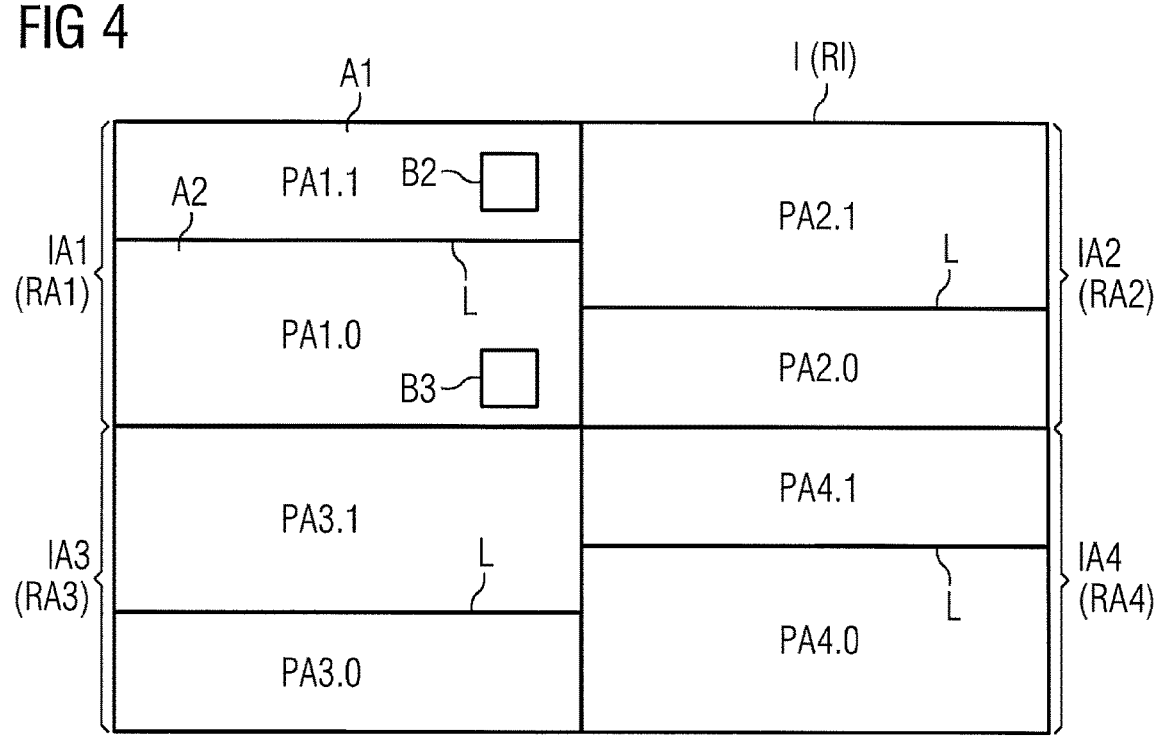
FIG. 4 shows a motion compensation process based on another embodiment.

FIG. 4 shows such a combined embodiment. Analogously to FIG. 3, the image I is divided into four image areas IA1, IA2, IA3, and IA4. For each image area, there exists an associated reference area RA1, RA2, RA3, and RA4 in the same position in a corresponding reference image RI. Each image area IA1 to IA4 forms a separate video in a mixed video stream where each of the videos is coded with the partial intra refresh coding as described with respect to FIG. 2. The border between the updated area A1 and the non-updated area A2 in the corresponding image areas is indicated by line L. As an example, an image block in the area A2 is indicated as B2 and an image block in the area A2 is indicated as B3.

In order to signal the prediction restrictions in the image I, a hierarchical index "x.y" is used, which specifies all image areas. According to this hierarchical index, it is only allowed to predict from a reference area with the same index x and the same sub-index y. However, in case that the sub-index "y" is 0, then prediction can be done from all picture areas having the same index "x". The hierarchical index is used to identify the corresponding updated and non-updated areas in all image areas in the image I. Those areas are designated as PA1.0, PA1.1, PA2.0, PA2.1, PA3.0, PA3.1, PA4.0, and PA4.1. A sub-index "y" having the value 0 refers to an updated-area whereas a sub-index "y" having the value 1 refers to a non-updated area. Based on the above described hierarchical index, e.g. the image area PA1.0 of the current image I can be predicted from image areas PA1.0 and PA1.1 in the reference image where the border L is slightly shifted upwards in the reference image because the intra-coding cycle is one step behind.

The above index scheme may also be used in order to allow predictions from all areas of the reference picture. This can be indicated by the index 0.0 (equivalent to index 0). Similar rules can also be applied for the definition of image areas with a higher indexing hierarchy, e.g. "x.y.z". In general, a list of reference areas of the reference image allowed for prediction of an image area in the current image can be signalled or defined by the above described hierarchical index scheme.

The above definitions of image areas may also be used to define artificial boundaries inside an image across which intra-prediction is not allowed. This mechanism avoids mismatches. E.g., in a mixed video stream, no prediction from pixels from a neighboring image area is done since these pixels were not available for intra-prediction in the originally-coded video before mixing. Furthermore, in video streams using partial intra refresh, normally intra-prediction from the non-updated area to the updated area can occur. In case of random access into the video stream, the pixels in a non-updated area might not be available anymore, i.e. are not decoded correctly. The usage of image areas will prohibit intra-prediction in these cases. Also for other processing steps than intra-prediction (e.g. deblocking filtering, in-loop filtering, interpolation filtering and so on) artificial borders can be defined using image areas for the current image. Similar to the case of intra-prediction, picture values from neighboring image areas must not be used for the processing inside the active image area. This avoids mismatches if the neighborhood changes (e.g., due to mixing of streams or random access into coded streams using partial intra refresh).

Contrary to the prediction of image blocks, entropy coding can be done across image areas. Joint statistical models can be used to code all the information (i.e. syntax elements) in an image. Resetting of context models is not necessary. Thus, the usage of image areas allows more flexibility for entropy coding which results in a coding efficiency.

The embodiments described above have several advantages. A border-aware motion compensation process for mixed video streams can be performed by defining appropriated image areas and associated reference areas. This is not possible with the definition of updated and non-updated areas as described in the previously mentioned Kazui et al. documents. A unified signalling of border-aware motion compensation for mixed video streams and coded video streams using partial intra refresh can be used. Mismatches for inter-prediction, intra-prediction, and other intra-picture processing steps can be avoided in mixed video streams.

Preferred embodiments result in a higher coding efficiency. Particularly, by using border extension algorithms for pixels of a reference block which lie outside a corresponding reference area, there is a higher flexibility in the choice of reference blocks used for prediction. With respect to entropy coding, joint statistics can be used for several or all image areas since resetting of context models does not need to be done at boundaries between image areas.

Figure 5:
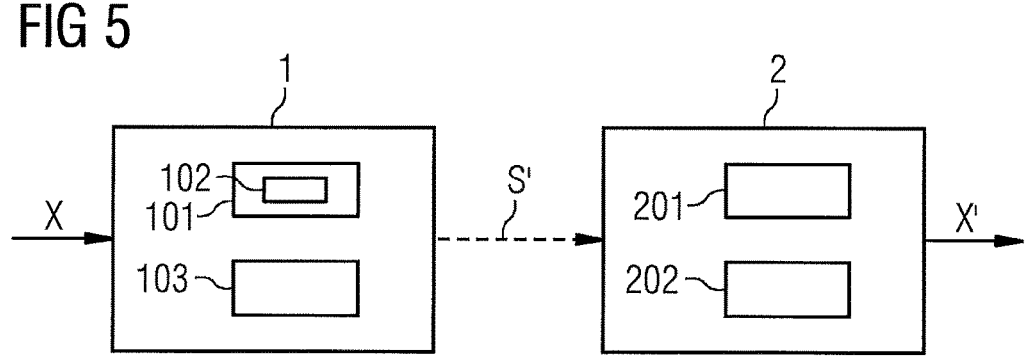
FIG. 5 is a schematic diagram illustrating a system for coding and decoding a video stream according to an embodiment.

FIG. 5 shows an embodiment of a system for coding and decoding a video stream. The digital video stream X is coded by a coding apparatus 1 which includes a means 101 for performing a motion compensation process, said motion compensation process using motion vectors between image blocks in a current image and reference blocks in a reference image, where for each image block or at least a part of the current image a temporal prediction based on a corresponding reference block indicated by a motion vector is performed, resulting in a prediction error between the image block and the corresponding reference block. The coding apparatus further includes a means 103 for coding the prediction error produced by motion compensation means 101. The motion compensation means 101 further includes a means for dividing the current image in the video stream into several image areas, a reference area in the reference image being associated with each image area, wherein the temporal prediction of an image block in an image area is based on a reference block at least partially located in the reference area associated with the image area and exclusively including pixel information from this reference area.

The video stream coded by the coding apparatus 1 is designated as S' and processed by a corresponding decoding apparatus 2. This decoding apparatus includes a means 201 for decoding the prediction error included in the stream S' as well as a means 202 for performing a motion compensation process using the same motion vectors which have been used for coding in the coding apparatus 1. To do so, the motion vectors determined in the coding apparatus 1 are transmitted to the decoding apparatus 2. As a result, a decoded video stream X' is output by the decoding apparatus 2.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide V. DIRECTV*, 69 USPQ2d 1865 (Fed. Cir. 2004).

The invention claimed is:

1. A method for coding a sequence of video frames of a mixed video stream comprising a plurality of separate videos streamed simultaneously in the sequence of video frames, each video frame in the sequence being divided into a plurality of fixed image areas, each fixed image area corresponding to one of the separate videos of the mixed video stream, the method comprising:

performing a motion compensation process using motion vectors between image blocks corresponding to a number of pixels in a current image and reference blocks corresponding to a number of pixels in a reference image, said current image being divided into the plurality of fixed image areas corresponding to the plurality of separate videos, and said reference image being based on one or more images of the sequence of video frames and being divided into a plurality of reference image areas corresponding to the plurality of fixed image areas of the current image, wherein each image block is located in one of the fixed image areas of the current image, wherein each of the plurality of reference image areas corresponding to the plurality of separate videos is divided into an updated intra-coded sub-area and a non-updated intra-coded sub-area, wherein the motion compensation process includes performing, for each image block of at least a part of the current image, a temporal prediction based on a corresponding reference block indicated by a motion vector, resulting in a prediction error between the image block and the corresponding reference block, wherein said prediction error is coded;

wherein for each temporal prediction of an image block located in a respective fixed image area of the current image, the reference block used for the temporal prediction is limited to pixel information only from within a partial portion of the reference image defined by (a) the respective reference image area corresponding to the respective fixed image areas of the current image, and (b) within the respective reference image area, a subset of the respective reference image area corresponding to the non-updated intra-coded sub-area of the respective reference image area.

2. The method according to claim 1, wherein border reference blocks extending beyond a corresponding reference area are used for temporal prediction, where the values of the pixels of a border reference block which lie outside the reference area are determined based on values of pixels of the border reference block inside the reference area.

3. The method according to claim 2, wherein the values of pixels of a border reference block which lie at the border of the reference area are assigned to pixels of the border reference block which lie outside the reference area.

4. The method according to claim 1, wherein the reference image is a reconstructed image generated from an image compressed during coding or includes parts from reconstructed images.

5. The method according to claim 1, wherein the coding of the prediction error includes a transformation step, a quantisation step and an entropy coding step.

6. The method according to claim 1, wherein the sequence of images is a mixed video stream comprising several videos, where each image area and reference area associated with the image area correspond to a video in the mixed video stream.

7. The method according to claim 1, wherein one or more of the image areas are each divided into sub-areas, where for one or more of the sub-areas additional coding restrictions apply.

8. The method according claim 7, wherein the division of an image into image areas and sub-areas is indicated by a hierarchical index scheme, where the same hierarchical index value refers to corresponding areas in the current image and the reference image for which temporal prediction is allowed, where preferably an additional index is reserved which is used to indicate a sub-area in the image area which can be temporally predicted from all sub-areas in the reference image which are in the same hierarchy level as the sub-area in the image area.

9. The method according to claim 1, wherein spatially subsequent sections in at least one image area are intra-coded from one current image to the next, wherein an intracoding cycle is defined such that, after a predetermined number of images has been coded, the whole image area has been intra-coded.

10. The method according to claim 9, wherein said at least one image area is divided in an updated and a non-updated sub-area, the updated sub-area referring to those sections which have already been intra-coded in the intra-coding cycle and the non-updated sub-area referring to those sections which have not yet been intra-coded in the intra-coding cycle.

11. The method according to claim 10, wherein the temporal prediction of an image block in an updated sub-area is based on a reference block exclusively including pixel information from an updated sub-area of the reference area associated with the image area, whereas the temporal prediction of an image block in a non-updated sub-area is based on a reference block which can include pixels from the updated and the non-updated sub-area of the reference area.

12. The method according to claim 1, wherein the image areas and/or additional image areas in the current image are processed independently of each other with respect to one or more predetermined processing steps other than temporal prediction, particularly for intra-prediction and/or deblocking filtering and/or in-loop filtering and/or interpolation filtering.

13. The method according to claim 1, wherein the division of the images into image areas is signalled in each coded image and/or in a parameter set defined separately from the coded images.

14. A method for coding and decoding a sequence of video frames of a mixed video stream comprising a plurality of separate videos streamed simultaneously in the sequence of video frames, each video frame in the sequence being divided into a plurality of fixed image areas, each fixed image area corresponding to one of the separate videos of the mixed video stream, the method comprising:
coding the sequence of video frames by:
performing a motion compensation process using motion vectors between image blocks corresponding to a number of pixels in a current image and reference blocks corresponding to a number of pixels in a reference image, said current image being divided into the plurality of fixed image areas corresponding to the plurality of separate videos, and said reference image being based on one or more images of the sequence of video frames and being divided into a plurality of reference image areas corresponding to the plurality of fixed image areas of the current image,
wherein each image block is located in one of the fixed image areas of the current image,
wherein each of the plurality of reference image areas corresponding to the plurality of separate videos is divided into an updated intra-coded sub-area and a non-updated intra-coded sub-area,
wherein the motion compensation process includes performing, for each image block of at least a part of the current image, a temporal prediction based on a corresponding reference block indicated by a motion vector, resulting in a prediction error between the image block and the corresponding reference block, wherein said prediction error is coded;
wherein for each temporal prediction of an image block located in a respective fixed image area of the current image, the reference block used for the temporal prediction is limited to pixel information only from within a partial portion of the reference image defined by (a) the respective reference image area corresponding to the respective fixed image areas of the current image, and (b) within the respective reference image area, a subset of the respective reference image area corresponding to the non-updated intra-coded sub-area of the respective reference image area; and
decoding the sequence of video frames, wherein the prediction error is decoded and a motion compensation process is performed using the same motion vectors as for coding.

15. An apparatus for coding sequence of video frames of a mixed video stream comprising a plurality of separate videos streamed simultaneously in the sequence of video frames, each video frame in the sequence being divided into a plurality of fixed image areas, each fixed image area corresponding to one of the separate videos of the mixed video stream, the apparatus comprising:
a motion compensation unit comprising a processor and computer instructions stored in non-transitory computer-readable media and executable by the processor to perform a motion compensation process using motion vectors between image blocks corresponding to a number of pixels in a current image and reference blocks corresponding to a number of pixels in a reference image, said current image being divided into the plurality of fixed image areas corresponding to the plurality of separate videos, and said reference image being based on one or more images of the sequence of video frames and being divided into a plurality of reference image areas corresponding to the plurality of fixed image areas of the current image,
wherein each image block is located in one of the fixed image areas of the current image,
wherein each of the plurality of reference image areas corresponding to the plurality of separate videos is divided into an updated intra-coded sub-area and a non-updated intra-coded sub-area,
wherein the motion compensation process includes performing, for each image block of at least a part of the current image, a temporal prediction based on a corresponding reference block indicated by a motion vector, resulting in a prediction error between the image block and the corresponding reference block, wherein said prediction error is coded;
wherein for each temporal prediction of an image block located in a respective fixed image area of the current image, the reference block used for the temporal prediction is limited to pixel information only from within a partial portion of the reference image defined by (a) the respective reference image area corresponding to the respective fixed image areas of the current image, and (b) within the respective reference image area, a subset of the respective reference image area corresponding to the non-updated intra-coded sub-area of the respective reference image area.

16. The apparatus according to claim 15, wherein the apparatus is arranged for performing a method.

17. An apparatus for coding and decoding a sequence of video frames, wherein the system includes an apparatus according to claim 15.

* * * * *